United States Patent
Ross et al.

(10) Patent No.: US 8,985,391 B2
(45) Date of Patent: Mar. 24, 2015

(54) VACUUM SYSTEM FEED ASSIST MECHANISM

(71) Applicant: Graco Minnesota Inc., Minneapolis, MN (US)

(72) Inventors: Daniel P. Ross, Maplewood, MN (US); Paul R. Quam, Minneapolis, MN (US); Joseph E. Tix, Hastings, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 162 days.

(21) Appl. No.: 13/659,946

(22) Filed: Oct. 25, 2012

(65) Prior Publication Data

US 2013/0105526 A1    May 2, 2013

Related U.S. Application Data

(60) Provisional application No. 61/552,243, filed on Oct. 27, 2011.

(51) Int. Cl.
| | | |
|---|---|---|
| *B67B 7/00* | (2006.01) | |
| *G01F 11/00* | (2006.01) | |
| *B67D 7/80* | (2010.01) | |
| *B05B 7/00* | (2006.01) | |
| *B29B 13/02* | (2006.01) | |
| *B05B 7/14* | (2006.01) | |
| *B05B 7/16* | (2006.01) | |
| *B05B 9/04* | (2006.01) | |
| *B29C 31/02* | (2006.01) | |
| *B65G 53/14* | (2006.01) | |

(52) U.S. Cl.
CPC ............. *B29B 13/022* (2013.01); *B05B 7/1404* (2013.01); *B05B 7/1472* (2013.01); *B05B 7/16* (2013.01); *B05B 9/0409* (2013.01); *B29C 31/02* (2013.01); *B65G 53/14* (2013.01)
USPC .......... 222/1; 222/146.2; 222/146.5; 222/630

(58) Field of Classification Search
CPC .......... B05B 7/00; B05B 7/1404; B05B 7/16; B29B 13/022; B65G 53/14
USPC ................. 222/152, 205, 630, 637, 1, 59, 64, 222/146.2, 146.5
See application file for complete search history.

(56) References Cited

U.S. PATENT DOCUMENTS

| 4,371,096 | A | * | 2/1983 | Scholl et al. ................... 222/190 |
| 4,387,852 | A | * | 6/1983 | Mattson et al. ............... 239/143 |

(Continued)

FOREIGN PATENT DOCUMENTS

| EP | 0 718 234 A2 | 6/1996 |
| EP | 1 772 196 A1 | 4/2007 |

OTHER PUBLICATIONS

International Search Report and Written Opinion from PCT Application Serial No. PCT/US2012/061764, dated Feb. 28, 2013, 8 pages.

*Primary Examiner* — Paul R Durand
*Assistant Examiner* — Vishal Pancholi
(74) *Attorney, Agent, or Firm* — Kinney & Lange, P.A.

(57) ABSTRACT

A hot melt dispensing system including a container for storing adhesive pellets, a feed system for transporting adhesive pellets from the container, and a blower. The blower is positioned with respect to an inlet of the feed system for applying a flow of air for agitating the adhesive pellets and moving the adhesive pellets toward the inlet.

10 Claims, 3 Drawing Sheets

(56) References Cited

U.S. PATENT DOCUMENTS

| | | | |
|---|---|---|---|
| 4,487,365 A * | 12/1984 | Sperber | 239/8 |
| 4,628,644 A * | 12/1986 | Somers | 451/90 |
| 4,919,308 A * | 4/1990 | Majkrzak | 222/146.5 |
| 5,244,019 A * | 9/1993 | Derby | 141/65 |
| 5,318,198 A | 6/1994 | Micek et al. | |
| 5,868,319 A * | 2/1999 | Gilmore | 239/290 |
| 6,095,803 A * | 8/2000 | Slater | 432/13 |
| 6,371,174 B1 * | 4/2002 | Zook et al. | 141/65 |
| 6,378,782 B1 | 4/2002 | Craine et al. | |
| 6,892,909 B1 * | 5/2005 | Hebert et al. | 222/637 |
| 7,798,749 B2 * | 9/2010 | Charhut et al. | 406/86 |
| 2009/0095730 A1 * | 4/2009 | Ganzer et al. | 219/421 |
| 2010/0255975 A1 * | 10/2010 | Mauchle et al. | 494/2 |
| 2011/0210185 A1 * | 9/2011 | Lundstrom et al. | 239/9 |

* cited by examiner

VACUUM SYSTEM FEED ASSIST MECHANISM

BACKGROUND

The present disclosure relates generally to systems for dispensing hot melt adhesive. More particularly, the present disclosure relates to feeding solid adhesive pellets in a system for dispensing hot melt adhesive.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

SUMMARY

According to the present invention, a hot melt dispensing system includes a container for storing adhesive pellets, a feed system for transporting adhesive pellets from the container, and a blower. The blower is aligned with an inlet of the feed system for applying a flow of air toward the feed system.

Another embodiment is a hot melt dispensing system including a container for storing adhesive pellets, a feed system for transporting adhesive pellets from the container, and a blower. The blower is positioned with respect to an inlet of the feed system for applying a flow of air for agitating the adhesive pellets and moving the adhesive pellets toward the inlet.

Another embodiment is a method of operating a hot melt dispensing system. The method includes directing a burst of air into a container of adhesive pellets for agitating the adhesive pellets, and transporting adhesive pellets from the container to a melter via a feed system.

DETAILED DESCRIPTION

Figure 1:
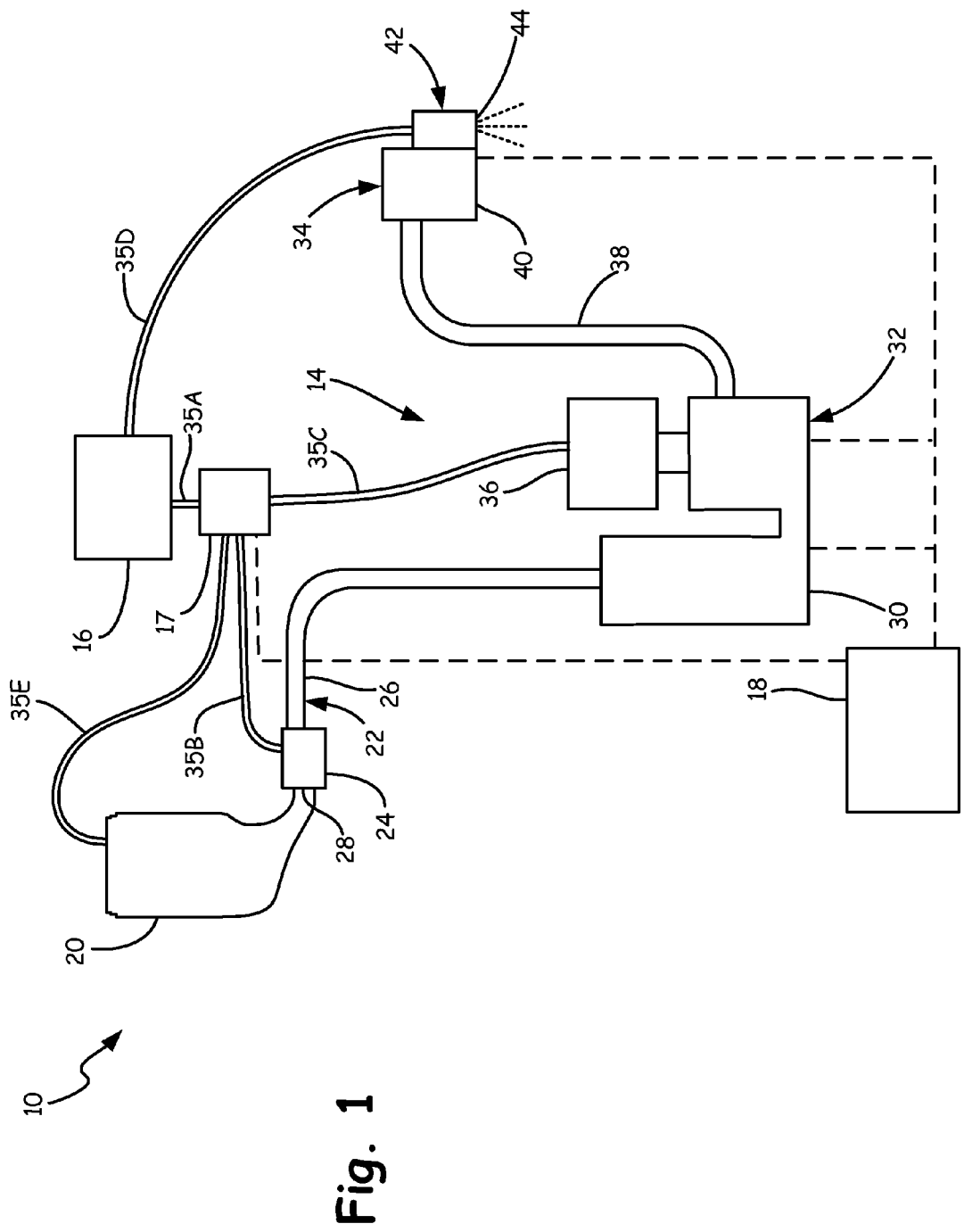
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Air hose 35E extends from air control valve 17 to container 20 for delivering bursts of air in container 20 as further described with respect to FIG. 2. In alternative embodiments, air hose 35E can be connected directly to air source 16, bypassing air control valve 17, or connected to a different air source (not shown) or a different air control valve (not shown). Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container (not shown) and resistive heating elements (not shown) for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by pulses of compressed air from air source 16 and air control valve 17. Pump 32 can be a linear displacement pump driven by motor 36. In the illustrated embodiment, dispenser 34 includes manifold 40 and module 42. Hot melt adhesive from pump 32 is received in manifold 40 and dispensed via module 42. Dispenser 34 can selectively discharge hot melt adhesive whereby the hot melt adhesive is sprayed out outlet 44 of module 42 onto an object, such as a package, a case, or another object benefiting from hot melt adhesive dispensed by system 10. Module 42 can be one of multiple modules that are part of dispenser 34. In an alternative embodiment, dispenser 34 can have a different configuration, such as a hand-held gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2:
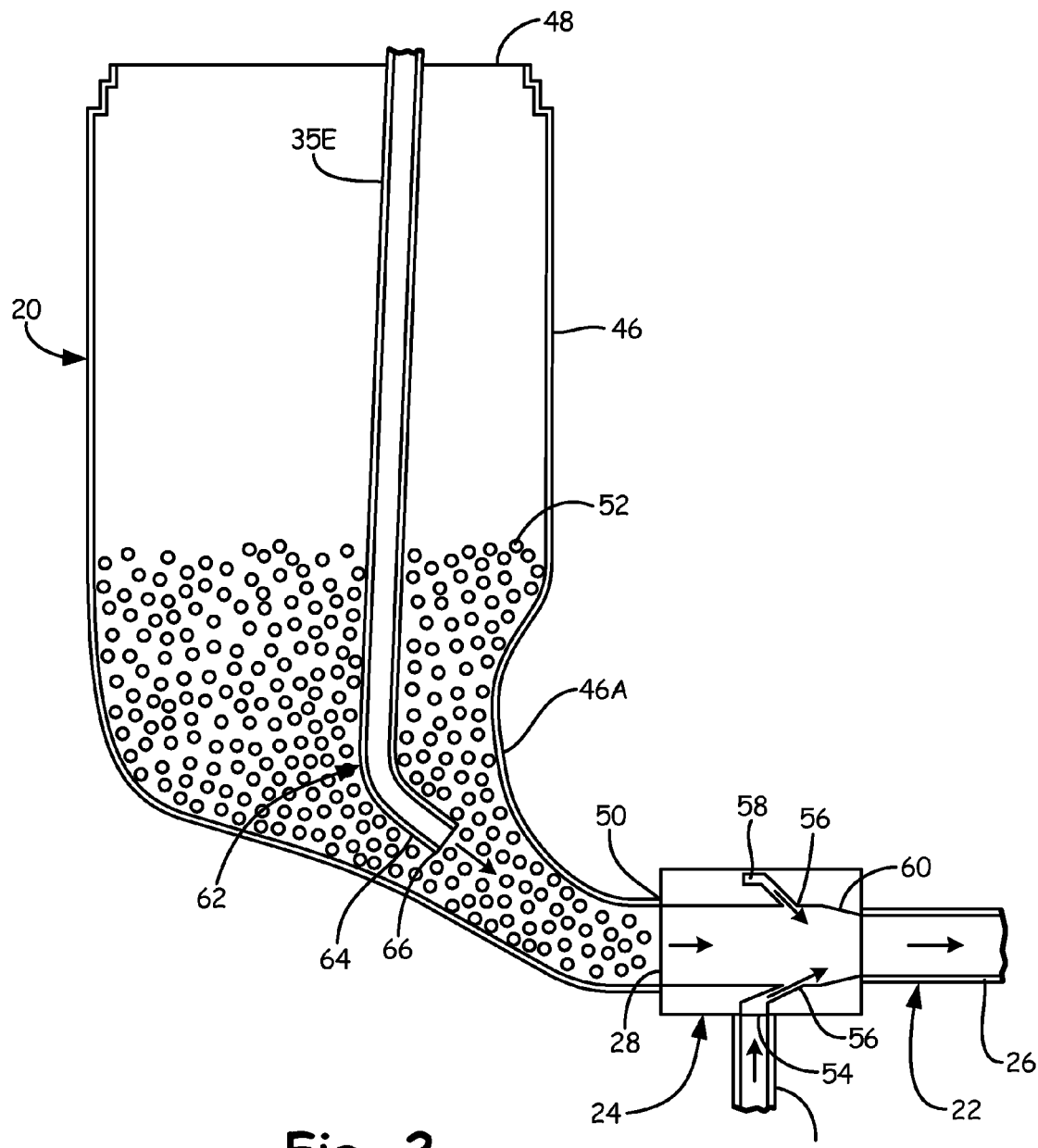
FIG. 2 is a side sectional view of a container and a feed assembly for use in the system of FIG. 1.

FIG. 2 is a side sectional view of container 20 and feed assembly 22. Container 20 includes container housing 46, pellet inlet 48 at a top of container housing 46, and pellet outlet 50 at a bottom of container housing 46. Funnel 46A is a portion of container housing 46 that is substantially funnel shaped near pellet outlet 50. In the illustrated embodiment, funnel 46A is angled with respect to vertical. Container 20 is a hopper that contains a quantity of adhesive pellets 52 for use by system 10 (shown in FIG. 1).

Feed assembly 22 is a feed system connected to pellet outlet 50 of container 20 for transporting adhesive pellets 52 from container 20 to melt system 30 (shown in FIG. 1). Inlet 28 of feed assembly 22 is a pellet inlet of vacuum assembly 24. Vacuum assembly 24 is a Venturi vacuum having Venturi air inlet 54 and ports 56. Distribution passage 58 connects Venturi air inlet 54 to ports 56. Ports 56 are Venturi air outlet ports angled to direct air downstream through feed assembly 22. Air from air hose 35B flows through Venturi air inlet 54, through distribution passage 58, and out at an angle through ports 56. Vacuum assembly 24 includes tapered section 60 downstream of ports 56 for reducing flow diameter along feed assembly 22. Vacuum assembly 24 creates a vacuum to draw adhesive pellets 52 into vacuum assembly 24, and the resulting air flow continues to push adhesive pellets 52 along through feed hose 26. The vacuum created by vacuum assembly 24 is a low pressure zone in feed assembly 22 for inducing flow of adhesive pellets 52 from container 20.

In certain situations, vacuum assembly 24 can have difficulty drawing adhesive pellets 52 from container 20 into feed assembly 22. For example, in some situations adhesive pellets 52 can stick to one another, forming a cluster of adhesive pellets 52 that can clog pellet outlet 50 of container 20. In such situations, blower 62 can administer a flow of air toward feed assembly 22. In one embodiment, the flow of air can be a relatively short, discrete burst of air. In other embodiments, the flow of air can be a relatively long flow of air. In the illustrated embodiment, blower 62 includes air hose 35E, nozzle 64, and outlet 66 of nozzle 64. In the illustrated embodiment, nozzle 64 is integrally formed with air hose 35E. In an alternative embodiment, nozzle 64 can be a separate piece connected to an outlet end of air hose 35E.

Air hose 35E supplies compressed air to nozzle 64 and out outlet 66 to agitate adhesive pellets 52 in container 20. Outlet 66 of nozzle 64 is positioned in container 20 upstream of inlet 28 of feed assembly 22. Nozzle 64 and outlet 66 can be angled so as to be aimed towards pellet outlet 50 of container 20 and inlet 28 of feed assembly 22. By aiming nozzle 64 toward pellet outlet 50, blower 62 can direct a burst of air toward adhesive pellets 52 near pellet outlet 50. That burst of air can break up clusters of adhesive pellets 52 that can clog pellet outlet 50. That burst of air can also assist in pushing and feeding adhesive pellets 52 into feed assembly 22 even when clogs are not formed.

In alternative embodiments, blower 62 need not be aimed directly toward pellet outlet 50 of container 20 and/or inlet 28 of feed assembly 22. Instead, blower 62 can be aimed in any direction suitable for agitating adhesive pellets 52 and moving adhesive pellets 52 toward inlet 28 of feed assembly 22.

In the illustrated embodiment, air hose 35E and blower 62 extend into container 20 through pellet inlet 48. Nozzle 64 and outlet 66 are positioned in funnel 46A of container housing 46, and have an angle with respect to vertical substantially the same as that of funnel 46A. In alternative embodiments, blower 62 can be positioned otherwise, such as extending through a hole (not shown) in container housing 46 or integrally formed with container housing 46.

In one embodiment, blower 62 can be activated automatically at regular intervals. For example, controller 18 (shown in FIG. 1) can activate air control valve 17 (shown in FIG. 1) for flowing a burst of air through air hose 35E and nozzle 64 every time adhesive pellets 52 are to be fed through feed assembly 22. In alternative embodiments, blower 62 can be activated at irregular intervals. For example, blower 62 can be selectively activated by a human operator. The human operator can activate blower 62 when clogs develop or start to develop, but need not activate blower 62 every time vacuum assembly 24 draws adhesive pellets 52 into feed system 22.

Figure 3:
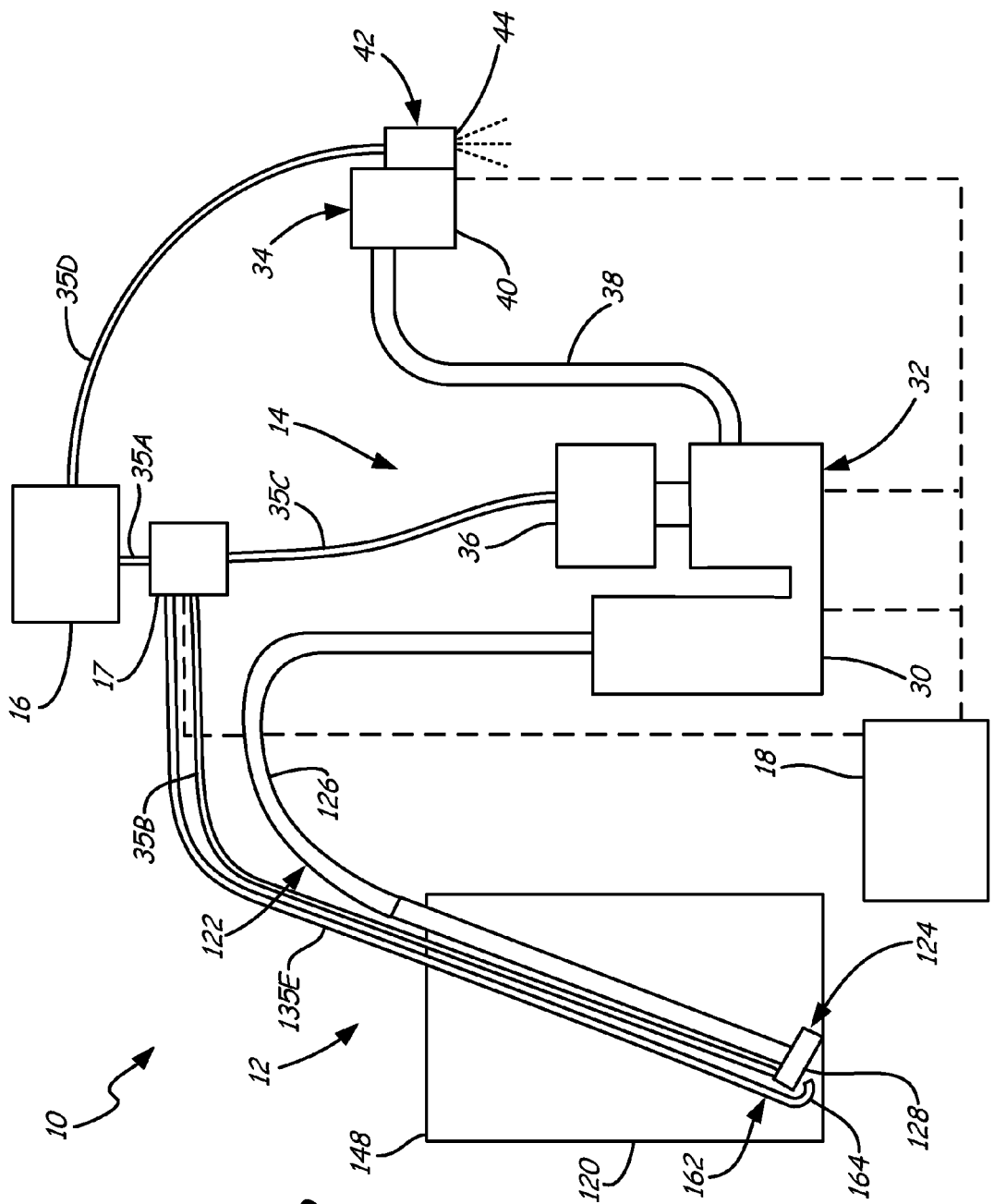
FIG. 3 is a schematic view of an alternative embodiment of the system for dispensing hot melt adhesive of FIG. 1.

FIG. 3 is a schematic view of system 110, which is a system for dispensing hot melt adhesive that is similar to system 10 (shown in FIGS. 1 and 2), except that system 10 includes container 120, feed assembly 122, and blower 162 in place of container 20, feed assembly 22, and blower 62 (shown in FIGS. 1 and 2). Container 120 includes pellet inlet 148 at its top. In the illustrated embodiment, container 120 is a barrel with no pellet outlet at its bottom. Feed assembly 122 inserted into container 120 through pellet inlet 148. Feed assembly 122 is a wand-type feed assembly with vacuum assembly 124 positioned at a bottom of feed hose 126. Compressed air from air source 16 and air control valve 17 is delivered to vacuum assembly 124 to create a vacuum, inducing flow of adhesive pellets 52 (shown in FIG. 2) into inlet 128 of vacuum assembly 124 and then through feed hose 126 to hot section 14.

Air hose 135E of blower 162 extends from air control valve 17 through pellet inlet 148 into container 120. Blower 162 is positioned with respect to inlet 128 applying a flow of air for agitating adhesive pellets 52 and moving adhesive pellets 52 toward inlet 128. In the illustrated embodiment, nozzle 164 is curved so as to be aimed toward inlet 128. In alternative embodiments, blower 162 can be shaped or configured differently than as illustrated so long as it is suitable for agitating and moving adhesive pellets 52 toward inlet 128.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, various components of system 10 or system 110 can be sized, shaped, and configured differently than as illustrated as appropriate for a given application.

The invention claimed is:

1. A hot melt dispensing system comprising:
    a container for storing adhesive pellets;
    a feed system for transporting adhesive pellets from the container, wherein the feed system comprises a venturi vacuum for creating a low pressure zone in the feed system for inducing flow of adhesive pellets from the container into the feed system; and wherein the venturi vacuum comprises a pellet inlet positioned substantially at a lowermost surface of the container and at an angle relative to the lowermost surface; and a blower positioned with respect to an inlet of the feed system for applying a flow of air for agitating the adhesive pellets and moving the adhesive pellets toward the inlet, wherein the blower comprises:

an air hose extending through an open top end of the container into the container; and a nozzle at a lower end of the air hose aimed towards the pellet inlet of the venturi vacuum, wherein an outlet of the nozzle is upstream of the pellet inlet of the venturi vacuum, and wherein the blower applies the flow of air in discrete bursts from the nozzle towards the pellet inlet of the venturi system.

2. The hot melt dispensing system of claim 1 and further comprising:

a melter connected to the feed system for heating adhesive pellets into a liquid form; and a dispenser for administering liquefied adhesive pellets from the melter.

3. A hot melt dispensing system comprising:

a container for storing adhesive pellets;

a feed system for transporting adhesive pellets from the container, wherein the feed system comprises a venturi vacuum for creating a low pressure zone in the feed system for inducing flow of adhesive pellets from the container into the feed system, and wherein the venturi vacuum is positioned at a lowermost part of the container; and a blower aligned with an inlet of the feed system for applying a flow of air toward the feed system, wherein the blower comprises:

an air hose extending through an open top end of the container into the container; and a nozzle at a lower end of the air hose aimed towards a pellet inlet of the venturi vacuum to direct the flow of air in discrete bursts toward the pellet input of the venturi vacuum, wherein the nozzle is located at a position above the lowermost portion of the container.

4. The hot melt dispensing system of claim 3 and further comprising:

a melter for heating adhesive pellets into a liquid form, connected to the feed system to receive the adhesive pellets; and a dispenser for administering liquefied adhesive pellets from the melter.

5. The hot melt dispensing system of claim 3, wherein an outlet of the blower is upstream of a pellet inlet of the venturi vacuum.

6. The hot melt dispensing system of claim 3, wherein an outlet of the blower is positioned in the container and angled toward a pellet outlet of the container.

7. The hot melt dispensing system of claim 3, wherein the container comprises a hopper with a pellet inlet at a top of the hopper and a pellet outlet at a bottom of the hopper.

8. The hot melt dispensing system of claim 3, wherein a portion of the container is substantially funnel shaped.

9. The hot melt dispensing system of claim 3, and further comprising:

an air source for supplying compressed air to the blower; and an air control valve connected between the air source and the blower.

10. A method of operating a hot melt dispensing system, the method comprising:

using gravity to direct adhesive pellets in a container toward a vacuum feed system;

directing a burst of air through a hose into the container of adhesive pellets for agitating the adhesive pellets, wherein the hose extends into the container through an open top end of the container and includes a nozzle at a lower end;

transporting adhesive pellets from the container to a melter via the vacuum feed system;

melting the adhesive pellets via the melter;

flowing liquefied adhesive pellets from the melter to a dispenser; and administering the liquefied adhesive pellets onto an object via a dispenser;

wherein the burst of air is directed via the nozzle at an inlet of the vacuum feed system, and wherein the burst of air breaks up clumps of adhesive pellets stuck to one another, and moves the adhesive pellets toward an inlet of the vacuum feed system, and wherein the inlet of the vacuum feed system is positioned at the lowermost part of the container and the nozzle is positioned at a vertical location above the inlet of the vacuum feed system.

* * * * *